(No Model.)
P. B. HAYDEN.
HARROW ATTACHMENT FOR PLOWS.
No. 557,269. Patented Mar. 31, 1896.
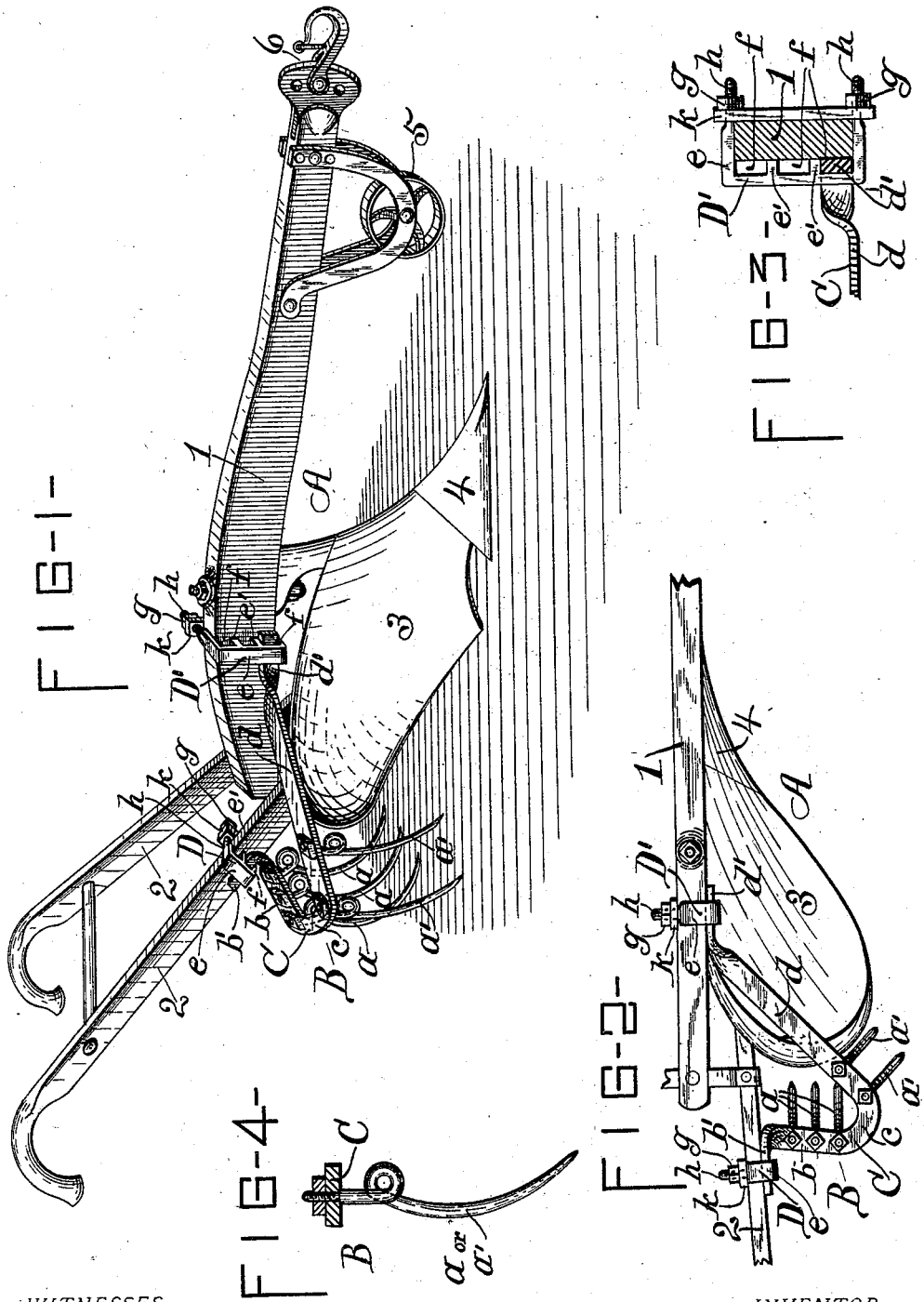
WITNESSES:
INVENTOR,
Perry B. Hayden,
BY
his ATTORNEY.

UNITED STATES PATENT OFFICE.

PERRY B. HAYDEN, OF SYRACUSE, NEW YORK.

HARROW ATTACHMENT FOR PLOWS.

SPECIFICATION forming part of Letters Patent No. 557,269, dated March 31, 1896.

Application filed February 19, 1895. Serial No. 538,934. (No model.)

*To all whom it may concern:*

Be it known that I, PERRY B. HAYDEN, a citizen of the United States, residing at Syracuse, in the county of Onondaga and State of New York, have invented certain new and useful Improvements in Harrow Attachments for Plows; and I do hereby declare the following to be a full, clear, and exact description of the invention, such as will enable others skilled in the art to which it appertains to make and use the same, reference being had to the accompanying drawings, in which—

Figure 1 is a perspective view illustrating my improved harrow attachment for plows and the manner of its connection to and relative disposition with a plow. Fig. 2 is a top plan of said harrow attachment and of a major portion of a plow as appearing in their operative combination, so well delineated in Fig. 1. Fig. 3 is a cross-sectional detail clearly illustrating the clip connection of my device to a plow, and Fig. 4 is an elevation detail of one of the several like teeth appertaining to my attachment and connection to the teeth-carrying bar forming the essential feature of my appliance.

Like letters and figures of reference indicate corresponding parts.

The object of my invention is the production of a novel form of harrow attachment expressly applicable and adapted for all ordinary types of plows, and in improved means of attachability to a plow and adjustability as well, and, broadly, the combining of a harrow attachment operatively with a plow in a manner both practical, efficient, and simple, while attaining simplicity and inexpensiveness of the attachment and in the connection of same to a plow.

My invention consists in the novel features of construction, coöperativeness, and operation hereinafter described, and fully set forth in the annexed claims.

Referring to the drawings, A indicates a plow of any ordinary or usual type, and comprising, essentially, a beam 1, of wood or metal, handles 2 2, moldboard 3, plow share or point 4, wheel 5, clevis 6, and other attributes, connected and operating in the well-known way.

B broadly denotes my improved harrow attachment for a plow, shown forth in the drawings in operative relation and combination with a plow, the said plow harrow attachment consisting of a peculiarly-formed teeth-carrying bar C, especially-arranged harrowing-teeth $a$ and $a'$, and the clips D and D' respectively securing the harrow attachment to one of the handles of the plow and the beam thereof in a manner both detachable and adjustable.

The flattened bar C, disposed flatwise horizontally and preferably of corresponding width and thickness throughout its major portion, is of an angular-like contour longitudinally, presenting in plan a J-like appearance, and comprising, essentially, the shortened length $b$ extending laterally outward from the lower portion of a handle 2 of the plow A slightly above the moldboard and at a substantial right angle to the plow-beam 1 or line of draft of the plow, thence to the outlying arc or segment-like portion $c$, in turn terminating in the elongated forwardly and inwardly slanting length $d$ joining the beam of the plow a moderate or satisfactory distance forward of the butt or rear end of the said beam. Necessarily, as represented, the slantwise-extended length of the teeth-carrying bar C is and should be double—or even more, perchance—the length of the rear laterally-straight length $b$, for the proper adaptation of and the operative attachment of said bar to the plow.

The portion $b$ of the bar C by a twist at its inner end terminates with a transverse edgewise-standing extension or lug $b'$ lying against the outer side of the plow-handle and detachably held thereto by the clip member D, while the portion $d$ by a twist terminates in an oblique disposed extension or lug $d'$, disposed on edge and parallel with the side of the plow-beam which it abuts and removably held thereto by my clip member D', which clips D and D' are adapted to support the teeth-carrying member—i. e., bar—of my attachment securely in operative position.

Preferably I have extending downward from the portion $b$ of the carrying-bar C three or more spring harrowing-teeth $a$, arranged side by side, working parallel to the draft of the plow, and of equal lengths and suitable dimensions, while, preferably, I utilize for the slanting forward portion $d$ of the bar a pair or more of similar spring-teeth a', so located with reference to said section of the bar as to insure the protuberant teeth, disposed side by side, standing out and down laterally in a direction right-angularly to said section d and diagonally to the line of the plow's beam. As is discernible from the drawings, the rear teeth a follow directly behind the moldboard B and the teeth a' outside (or practically so) the moldboard and in advance and to a side of the rear teeth a. The teeth a' may be of corresponding length and dimensions to the rear ones.

I may utilize any suitable common type of spring harrow-teeth and any ordinary kind— either coiled, curvilinear, or straight—although my preference is that form of spring-teeth herein illustrated.

The essential advantage and prime importance in having the spring-teeth located as specified and shown is that in the plowing of the soil by the plowshare the teeth a' necessarily catch the upper edge of the furrow, breaking same and leveling the ground, while the back teeth a follow lengthwise the furrow and do the work of a harrow through their pulverizing or disintegrating of the plowed earth.

The spring-teeth may at their butt-ends be firmly secured to the carrying-bar C in any customary or satisfactory manner whereby they will be rigidly held and not liable to turn—as, for instance, a threaded termination projecting through an aperture in the bar and a nut working on the threads and turned until the tooth is firmly attached.

The clips D D' comprise, respectively, an angular [-shaped plate e, from whose vertical inner face laterally projects a brief rib or ribs e', so relatively located as to create a socket or sockets f between same when the plate e is operatively secured to the plow beam or handle by means of nuts g working on threaded shanks h, that terminate the horizontal standing portions of the plate e, said shanks penetrating a binding-plate k lying against that side of the beam or handle opposite the ribbed part of the plate e. The seatable extremities b' or d' are inserted into one of the spaces f of the bar e, and then by the drawing together of the clips, as shown, the extremities are held firmly in place, and yet permitting of detachability or adjustability of the extremities of the teeth-carrying bar or arm C from a lower to a higher plane, and vice versa.

The adjustability of the attachment to a higher or lower level is an advantageous feature, enabling the ready raising or lowering of the harrow-teeth according to the depth of the plow in the soil, being raised when plowing deep and lowered when plowing shallow— a great desideratum. Obviously by the utilization of my plow harrow attachment when the ground is plowed it is concurrently harrowed and in readiness to receive grain.

In plowing ground with a plow devoid of a harrowing attachment the ground will, particularly if wet, bake down, while by the utilization of my attachment the soil is left in a honeycombed or loosened state. With my harrow attachment secured to a plow the necessity of the horses traveling over already-plowed ground solely for harrowing is obviated, the harrowing and plowing being uniosant.

An especial advantage of my construction of a plow harrow attachment is that in the plowing of sod ground it not only pulverizes and levels the earth, but coincidently effectually prevents same from falling back into the furrow. Moreover, in the employment of my attachment in conjunction with a plow there practically is no greater strain on the draft of the plow than there would be devoid of such attachment.

The value, practicability, and simplicity of my invention will be appreciated by tillers of the soil, saving, as it does, extra labor, time, and expense and insuring expedition in the preparation of the soil for seeding and other planting.

Having thus fully described my invention, what I claim as new, and desire to secure by Letters Patent, is—

1. The combination, with a plow, of an angular-like teeth-carrying plate of a J shape in plan, and extending laterally from a side of the plow and detachably and adjustably connected to the beam and a handle thereof respectively, said plate being provided with pendent spring-teeth so differentially arranged that one group extend forwardly in a direction antagonistic to a contiguous group of teeth, the said disposition adapting, in the plowing of soil, one group of teeth to catch the upper edge of a furrow and the other group of teeth to disintegrate the soil, substantially as described.

2. The combination, with a plow, of an angular or J-like teeth-carrying plate adjustably secured at its extremities to the beam and a handle of the plow and adaptable to be set at higher or lower planes, the advance elongated portion of said plate being provided at its extreme laterally-projecting part with a group of pendent teeth projecting in a direction diagonally to the line of the plow-beam, and the rear abbreviated portion of the plate being provided with a group of pendent teeth projecting in a direction parallel to the aforesaid beam, and nearer to said beam than the first-stated group of teeth, all arranged and operating substantially as described and for the purposes set forth.

3. The combination, with a plow, of a horizontally-flat bar of an angular or J-like shape longitudinally secured by its extremities to the plow-beam and a handle by means of clips having two or more spaces for the reception of the respective extremities of the bar and whereby said bar is adapted to adjustment to differential horizontal planes, the bar comprising an obliquely-extended forward portion having two or more downstanding spring-teeth located at its farthest outlying part, and comprising also a shorter portion extended transversely to the line of the plow-beam and having two or more downstanding spring-teeth, said last-named teeth standing parallel to the plow-beam, and the first-mentioned teeth standing diagonally antagonistic thereto and more remote from the beam of the plow, all combined, arranged, and operating in conjunction with the plow substantially as described and for the purposes set forth.

In testimony whereof I affix my signature, in presence of two witnesses, this 9th day of January, 1895.

PERRY B. HAYDEN. [L. S.]

Witnesses:
WM. C. RAYMOND,
M. D. LEWIS.